US012791769B2

(12) United States Patent
Cheng et al.

(10) Patent No.: US 12,791,769 B2
(45) Date of Patent: Nov. 10, 2026

(54) OPTICAL ELEMENT DRIVING MECHANISM

(71) Applicant: Actutek Corporation, Taoyuan City (TW)

(72) Inventors: Pai-Jui Cheng, Taoyuan City (TW); Shu-Shan Chen, Taoyuan City (TW); Chuan-Min Lee, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 236 days.

(21) Appl. No.: 18/671,518

(22) Filed: May 22, 2024

(65) Prior Publication Data

US 2024/0393507 A1 Nov. 28, 2024

Related U.S. Application Data

(60) Provisional application No. 63/504,648, filed on May 26, 2023.

(51) Int. Cl.
*G02B 5/00* (2006.01)

(52) U.S. Cl.
CPC .................................... *G02B 5/005* (2013.01)

(58) Field of Classification Search
CPC . G02B 5/005; G02B 7/00; G02B 5/00; G03B 30/00; G03B 9/36
USPC .......................................................... 359/227
See application file for complete search history.

(56) References Cited

U.S. PATENT DOCUMENTS

| | | | | |
|---|---|---|---|---|
| 2004/0052170 A1* | 3/2004 | Ikeda | | G11B 7/093 |
| 2020/0201143 A1* | 6/2020 | Imai | | G03B 11/043 |
| 2020/0249415 A1* | 8/2020 | Wang | | G03B 11/043 |
| 2020/0363699 A1* | 11/2020 | Wang | | G03B 3/02 |
| 2020/0393667 A1* | 12/2020 | Wang | | H02N 2/043 |
| 2022/0120997 A1* | 4/2022 | Wang | | H04N 23/57 |
| 2022/0121025 A1* | 4/2022 | Wang | | G02B 7/04 |
| 2023/0403468 A1* | 12/2023 | Shikama | | H04N 23/687 |

FOREIGN PATENT DOCUMENTS

| | | | | |
|---|---|---|---|---|
| CN | 216595693 | * | 5/2022 | G02B 27/646 |

OTHER PUBLICATIONS

English translation of CN216595693 (Year: 2022)(May 24, 2022).*

* cited by examiner

*Primary Examiner* — William R Alexander
*Assistant Examiner* — Kuei-Jen L Edenfield
(74) *Attorney, Agent, or Firm* — MUNCY, GEISSLER, OLDS & LOWE, P.C.

(57) ABSTRACT

An optical element driving mechanism is provided. The optical element driving mechanism includes a movable part, a fixed part, and a sensing assembly. The movable part is used for connecting an optical element. The fixed part has an opening for allowing light to pass through. The movable part moves relative to the fixed part. The sensing assembly is used for sensing the position of the movable part relative to the fixed part. When the movable part is within a first range, the optical element at least partially overlaps the opening.

12 Claims, 9 Drawing Sheets

OPTICAL ELEMENT DRIVING MECHANISM

CROSS REFERENCE TO RELATED APPLICATIONS

This application claims the benefit of U.S. Provisional Application No. 63/504,648, filed 2023 May 26, the entirety of which is incorporated by reference herein.

BACKGROUND OF THE INVENTION

Field of the Invention

The present invention relates to an optical element driving mechanism, and, in particular, it relates to an optical element driving mechanism having a sensing assembly for sensing the position of the movable part relative to the fixed part.

Description of the Related Art

With the recent developments in science and technology, many electronic devices (such as tablets and other computers) nowadays have the functionality of taking pictures and recording videos. The use of these electronic devices is becoming more and more common. In addition to developing products that are more stable and have better optical quality, they are also moving towards convenient and thinner designs to provide users with more choice. The design of electronic devices continues to move towards miniaturization, so that various elements or their structures used in optical modules such as cameras must also continue to shrink in order to achieve miniaturization. In view of this, how to design a miniaturized driving mechanism has become an important issue.

BRIEF SUMMARY OF THE INVENTION

The term “embodiment” and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate parts of the entire specification of this disclosure, any or all drawings, and each claim.

According to certain aspects of the present disclosure, an optical element driving mechanism is provided. The optical element driving mechanism includes a movable part, a fixed part, and a sensing assembly. The movable part is used for connecting an optical element. The fixed part has an opening for allowing light to pass through. The movable part moves relative to the fixed part. The sensing assembly is used for sensing the position of the movable part relative to the fixed part. When the movable part is within a first range, the optical element at least partially overlaps the opening.

In some embodiments of the present disclosure, the sensing assembly has a plurality of deformed parts located on both sides of the fixed part.

In some embodiments of the present disclosure, the deformed parts and the optical element have a plate structure.

In some embodiments of the present disclosure, the optical element has a first extending edge and a second extending edge, and the first extending edge and the second extending edge each has an extending edge angle.

In some embodiments of the present disclosure, the first extending edge and the second extending edge are located between the deformed parts.

In some embodiments of the present disclosure, each of the deformed parts has a first angle, and the extending edge angles are different than the first angle.

In some embodiments of the present disclosure, the extending edge angles are wider than the first angle.

In some embodiments of the present disclosure, an extending direction of the first extending edge and the second extending edge is toward a base of the fixed part.

In some embodiments of the present disclosure, each of the deformed parts each has a second angle, and the extending edge angles, the first angle, and the second angle are different.

In some embodiments of the present disclosure, the extending edge angles are wider than the second angle.

In some embodiments of the present disclosure, the second angle is wider than the first angle.

In some embodiments of the present disclosure, the optical element and the deformed parts have the same material.

In some embodiments of the present disclosure, the optical element and the deformed parts have the same thickness.

In some embodiments of the present disclosure, when the optical element is in a first position, the first extending edge contacts the sensing assembly, and the optical element driving mechanism is in a closed state.

In some embodiments of the present disclosure, when the optical element is in a second position, the second extending edge contacts the sensing assembly, and the optical element driving mechanism is in an open state.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
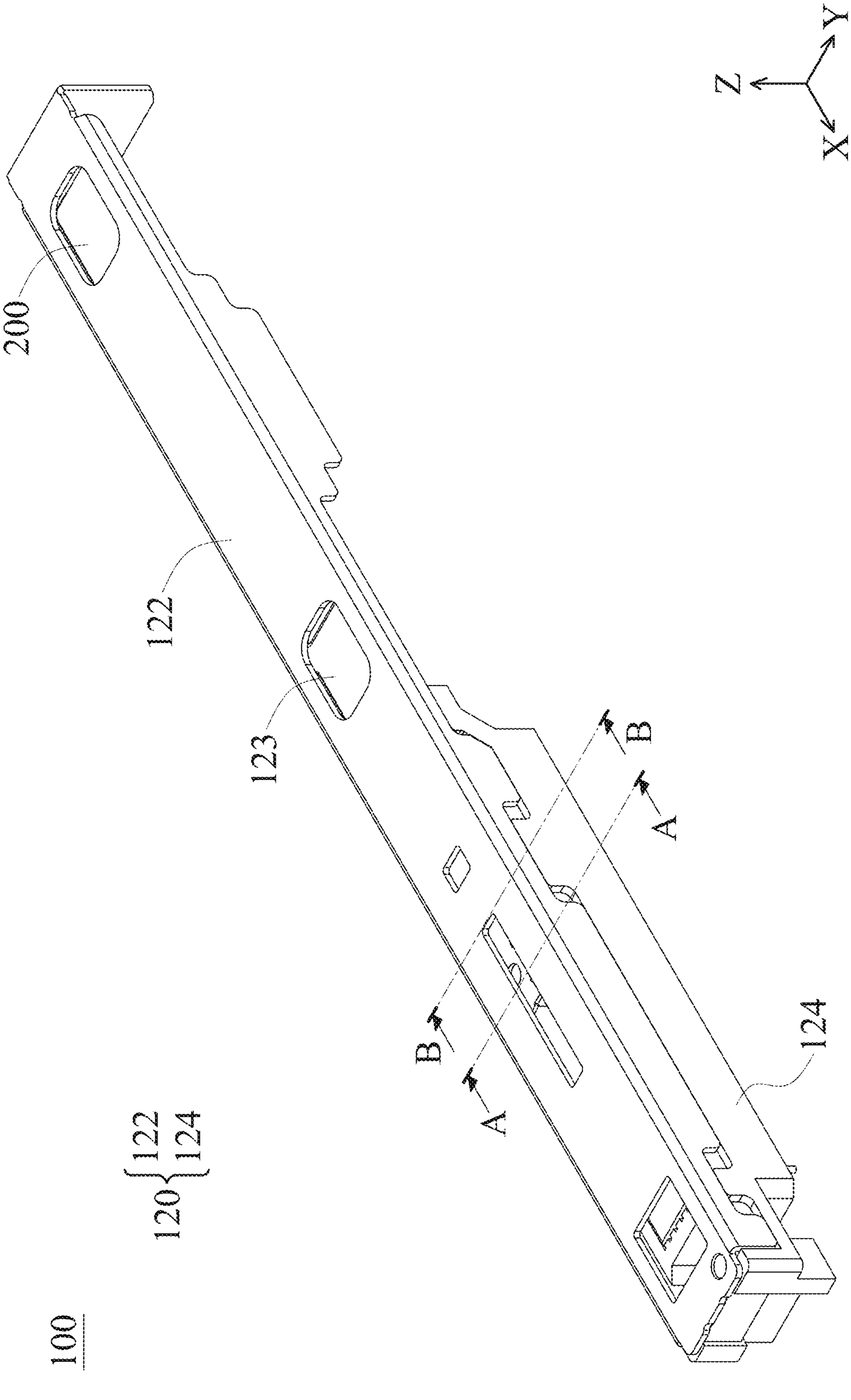
FIG. 1 is a front perspective view of an optical element driving mechanism and an optical element, according to certain aspects of the present disclosure.

Various embodiments are described with reference to the attached FIG.s, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features may be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, may be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
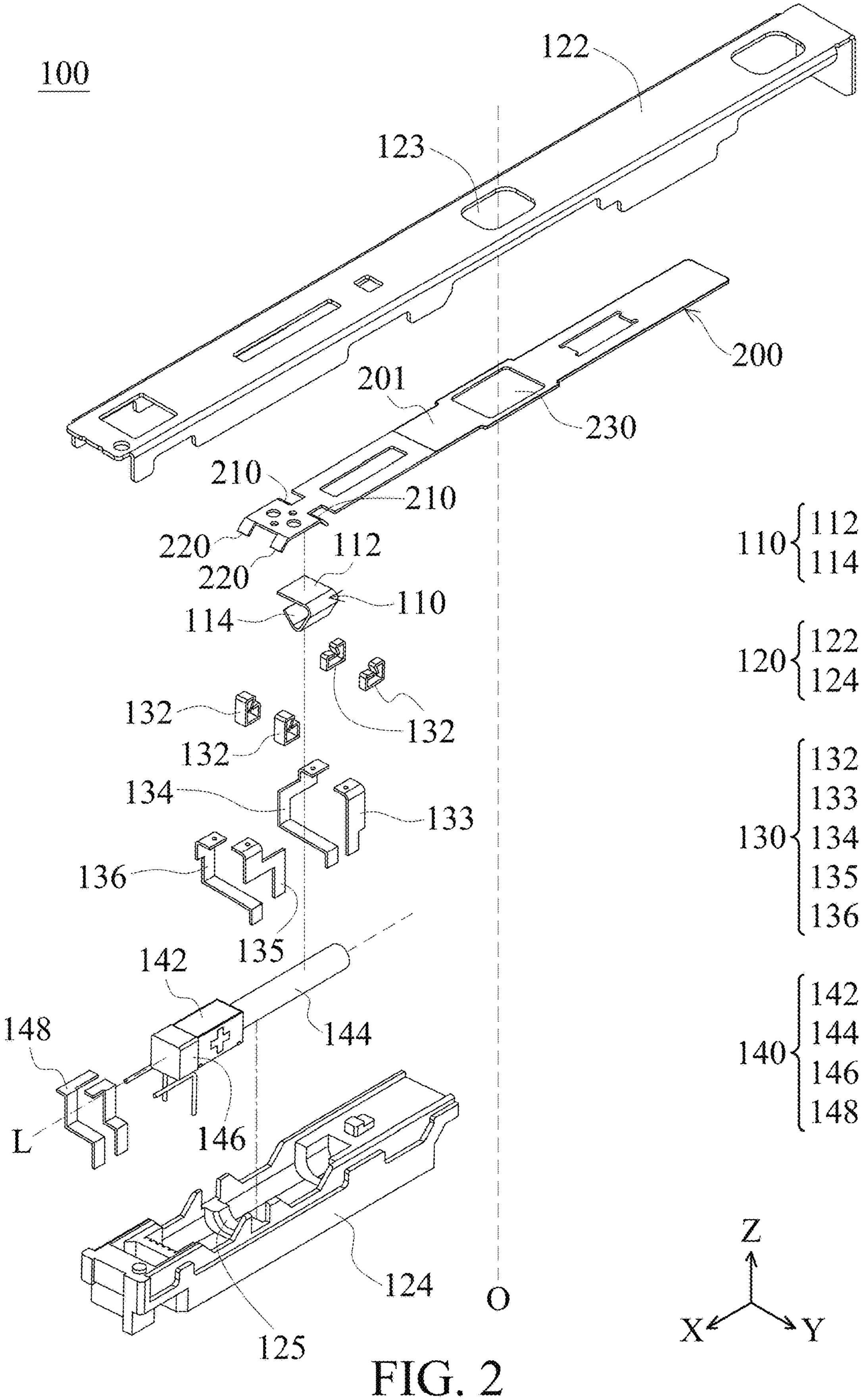
FIG. 2 is an exploded perspective view of the optical element driving mechanism and the optical element, according to certain aspects of the present disclosure.
Figure 3:
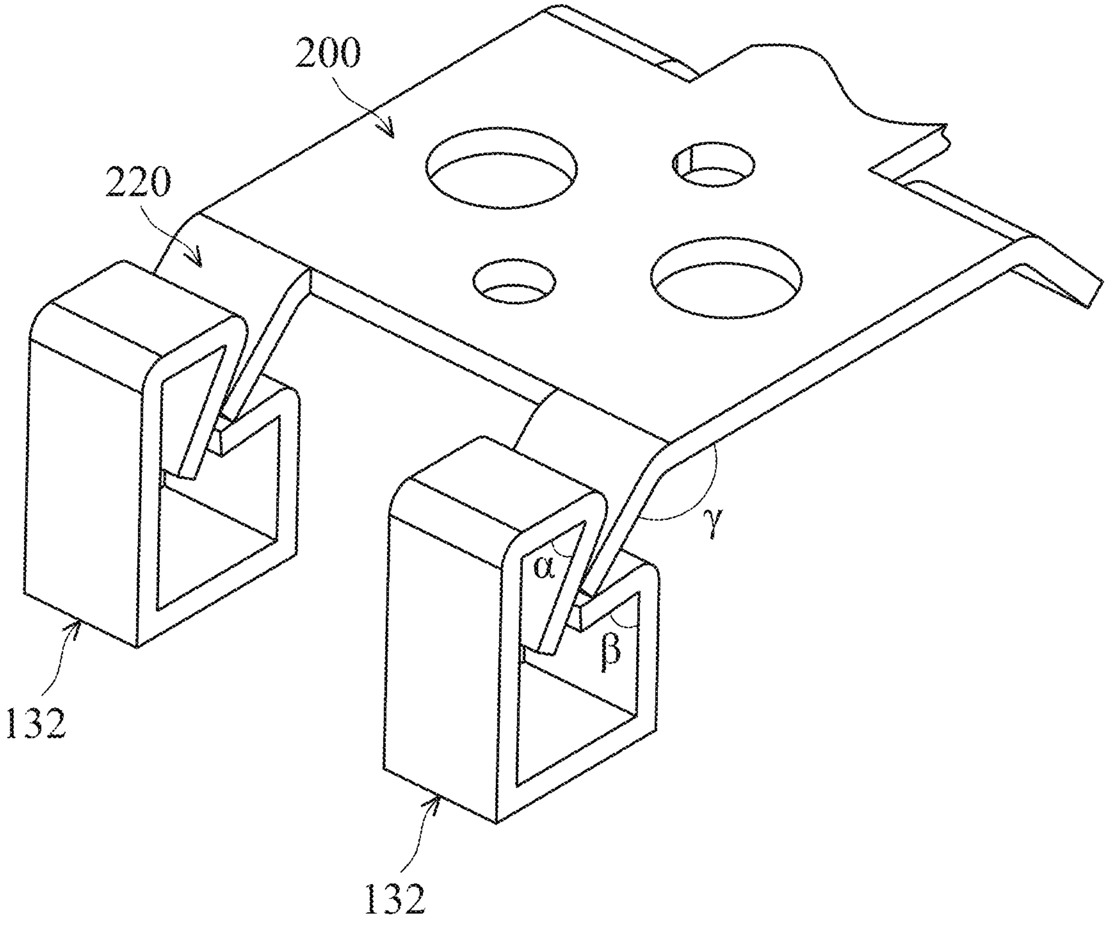
FIG. 3 is a perspective view of a part of the optical element located in the second position and the deformed parts, according to certain aspects of the present disclosure.

Please refer to FIG. 1 and FIG. 2. FIG. 1 is a front perspective view of an optical element driving mechanism 100, according to certain aspects of the present disclosure. FIG. 2 is an exploded perspective view of the optical element driving mechanism 100 and an optical element 200, according to certain aspects of the present disclosure. The optical element driving mechanism 100 includes a movable part 110, a fixed part 120, a sensing assembly 130, and a driving assembly 140. The movable part 110 is for connecting the optical element 200. The movable part 110 may move relative to the fixed part 120 between a first position and a second position. The sensing assembly 130 is for sensing the position of the movable part 110 relative to the fixed part 120. The driving assembly 140 drives the movable part 110 to move relative to the fixed part 120. The optical element driving mechanism 100 and the optical element 200 form an optical module. That is, the optical module includes the optical element driving mechanism 100 and the optical element 200. The sensing assembly 130 has four deformed parts 132. Next, please refer to FIG. 3. FIG. 3 is a perspective view of a part of the optical element 200 and the deformed parts 132 in a second position, according to certain aspects of the present disclosure. The optical element 200 contacts the deformed parts 132 of the sensing assembly 130, as will be described in detail below with respect to FIGS. 5A, 6A, and 7.

Figure 4A:
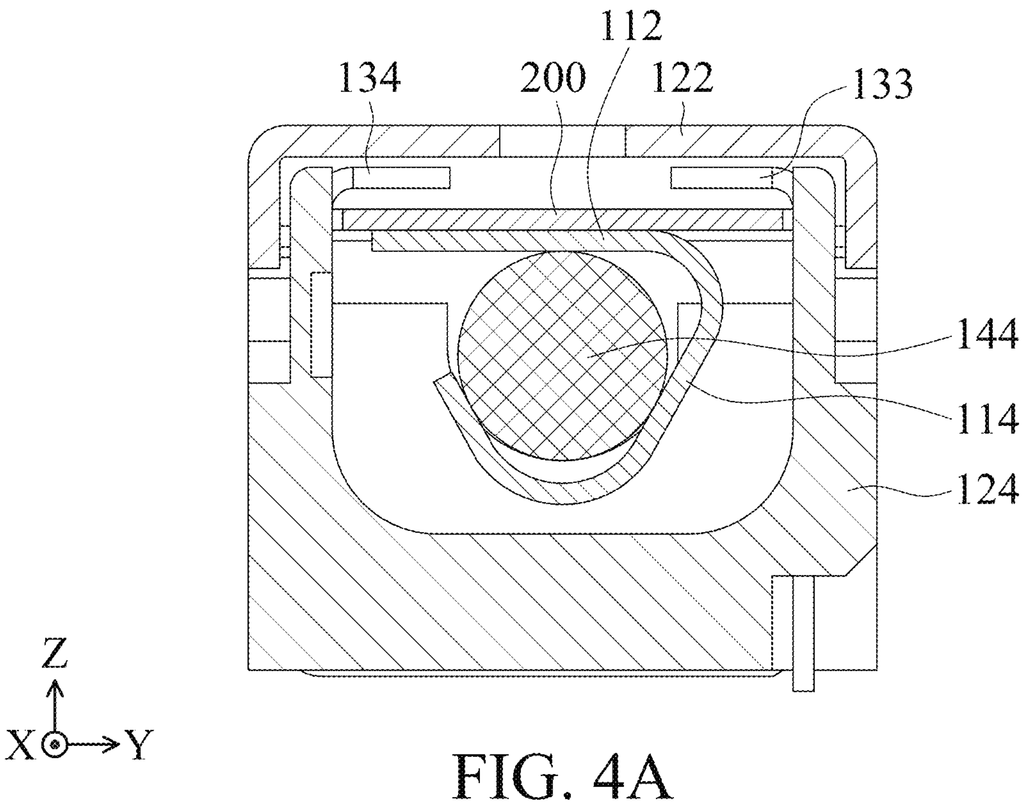
FIG. 4A is a cross-sectional view of the optical element driving mechanism and the optical element along line A-A of FIG. 1, according to certain aspects of the present disclosure.

Please see FIG. 4A. FIG. 4A is a cross-sectional view of the optical element driving mechanism and the optical element along line A-A of FIG. 1, according to certain aspects of the present disclosure. The movable part 110 has a joint part 112 and a holding part 114. In some embodiments, the movable part 110 may be an integrally formed metal element, wherein the joint part 112 is a plane, and the holding part 114 is a flexible metal piece connected to the joint part 112. The joint part 112 connects to the optical element 200, for example, in some embodiments, the joint part 112 is fixed to the optical element 200 by laser welding. The holding part 114 has an approximately V-shaped cross-section. The holding part 114 is connected to a conductive element 144 of the driving assembly 140. As shown in FIG. 4A, the holding part 114 holds the conductive element 144 so that when the conductive element 144 moves (as will be explained further below), it further drives the movable part 110 and the optical element 200 to move relative to the fixed part 120.

Please refer to FIG. 2 again. The fixed part 120 includes a housing 122 and a base 124. The housing 122 is fixed to the base 124, and the space formed between the housing 122 and the base 124 receives other components of the optical module. The housing 122 includes an opening 123 through which an optical axis O enters the optical module. The base 124 has a plurality of grooves 125 for receiving the conductive element 144 of the driving assembly 140.

In some embodiments, the sensing assembly 130 has four deformed parts 132, first circuit elements 133, 134, and second circuit elements 135, 136. The four deformed parts 132 are each laser welded and electrically connected to the first circuit elements 133, 134 and the second circuit elements 135, 136. The deformed parts 132 have a plate-like structure, are flexible, conductive, and bent metal sheets. The deformed parts 132 are located inside both sides of the housing 122 of the fixed part 120. Each of the deformed parts 132 has a first angle α and a second angle β (please see FIG. 3). The first circuit elements 133, 134 and the second circuit elements 135, 136 are fixed to the base 124. The first circuit elements 133, 134 and the second circuit elements 135, 136 are electrically connected to an external control assembly (not shown) to transmit the sensed position information to the external control assembly.

The optical element 200 is a metal sheet with a plate-like structure. The optical element 200 has a shielding part 201, a first extending edge 210, a second extending edge 220, and an opening 230. The extending direction of the first extending edge 210 and the second extending edge 220 is towards the base 124 of the fixed part 120. Each of the first extending edge 210 and the second extending edge 220 each forms an extending edge angle γ with the optical element 200 (please See FIG. 3, only the extending edge angle γ formed between the second extending edge 220 and the optical element 200 is marked). The shielding part 201 may be made of materials with light-shielding properties, such as SOMA. The first extending edge 210 and the second extending edge 220 are located between the four deformed parts 132. In the first position, the first extending edge 210 contacts the deformed parts 132, and in the second position, the second extending edge 220 contacts the deformed parts 132, as will be described below with respect to FIGS. 5A-6B. The opening 230 of the optical element 200 is larger than the opening 123 of the housing 122. The optical element 200 is laser welded to the joint part 112 of the movable part 110, so that the optical element 200 is driven by the conductive element 144 of the driving assembly 140 to move between the first position and the second position.

As shown in FIG. 2, the driving assembly 140 may include a driving element 142, a conductive element 144, a counterweight element 146, and a circuit assembly 148. The driving element 142 may have an elongated shape and extend along the direction in which the L-axis extends. The conductive element 144 and the counterweight element 146 may be connected to the driving element 142 and are disposed on both sides of the driving element 142. The conductive element 144 is connected to the base 124 of the fixed part 120 through a cushion element 126 (see FIG. 4B). The driving element 142 is electrically connected to the circuit assembly 148. The circuit assembly 148 is electrically connected to the external control assembly (not shown). In some embodiments, the external control assembly may read the position information of the optical element 200 from the first circuit elements 133, 134 and the second circuit elements 135, 136 of the sensing assembly 130, and output the control signal to the circuit assembly 148. Thereby, the driving element 142 may be controlled from the circuit assembly 148.

In some embodiments, the material of driving element 142 may include piezoelectric material. When an electric field (voltage) is applied to the surface of a piezoelectric material, the electric dipole moment will be elongated due to the action of the electric field. In order to resist the changes in the electric dipole moment, the piezoelectric material will elongate in the direction of the electric field, so that it produces mechanical deformation, thereby driving the conductive element 144 to move. For example, the electric dipole moment of the driving element 142 may be designed to extend on the X-axis to drive the conductive element 144 to move on the X-axis. The density of the counterweight element 146 may be greater than the density of the conductive element 144 to resist reaction forces when the driving element 142 is driven. In some embodiments, the material of conductive element 144 may include carbon fiber and the material of counterweight element 146 may include metal.

Figure 4B:
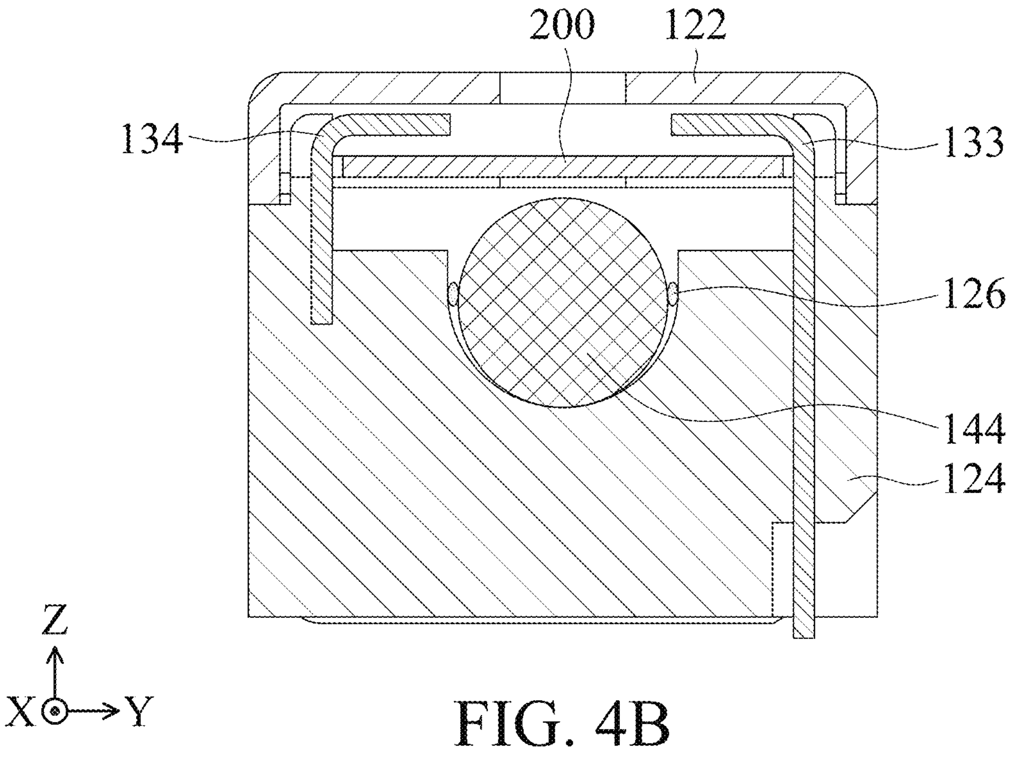
FIG. 4B is a cross-sectional view of the optical element driving mechanism and the optical element along line B-B of FIG. 1, according to certain aspects of the present disclosure.

Next, please refer to FIG. 4B. FIG. 4B is a cross-sectional view along line B-B of FIG. 1 of the optical element driving mechanism 100 and the optical element 200, according to certain aspects of the present disclosure. In some embodiments, the cushion element 126 surrounds the conductive element 144. In some embodiments, the material of the cushion element 126 may include an elastic material, such as silicone. In some embodiments, the cushion element 126 may be movably connected to the conductive element 144 through frictional contact to define the position of the conductive element 144.

Figure 5A:
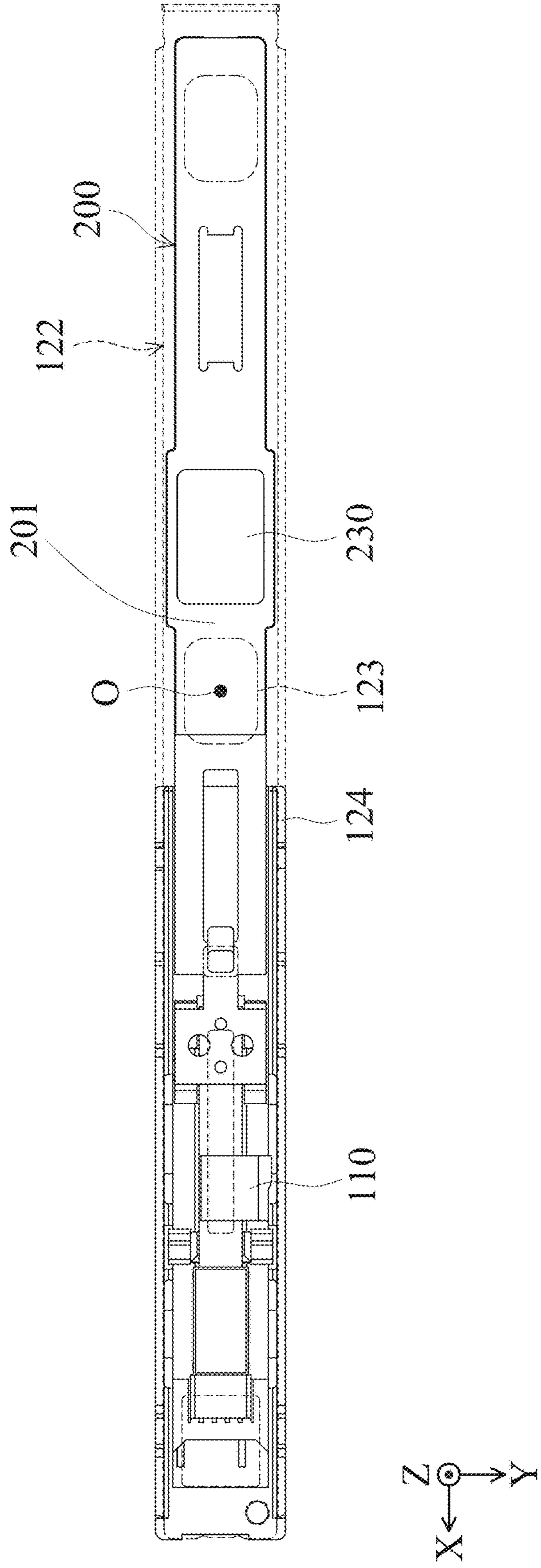
FIG. 5A is a top view of the optical element driving mechanism and the optical element in a first position, according to certain aspects of the present disclosure. For illustrative purposes, the housing of the fixed part is shown in dotted lines.

Next, please refer to FIG. 5A. FIG. 5A is a top view of the optical element driving mechanism 100 and the optical element 200 in a first position, according to certain aspects of the present disclosure. For illustrative purposes, the housing 122 of the fixed part 120 is shown in dotted lines. In the first position, the shielding part 201 of the optical element 200 completely overlaps the opening 123 of the housing 122. When the movable part 110 is in the first position, the optical axis O does not overlap with the opening 230, and the first extending edge 210 of the optical element 200 contacts the deformed part 132 (see FIG. 5B). At this time, the housing 122 and the opening 230 of the optical element 200 completely overlap, light may not enter the optical module through the opening 123, and the optical element 200 is in a closed state.

Figure 5B:
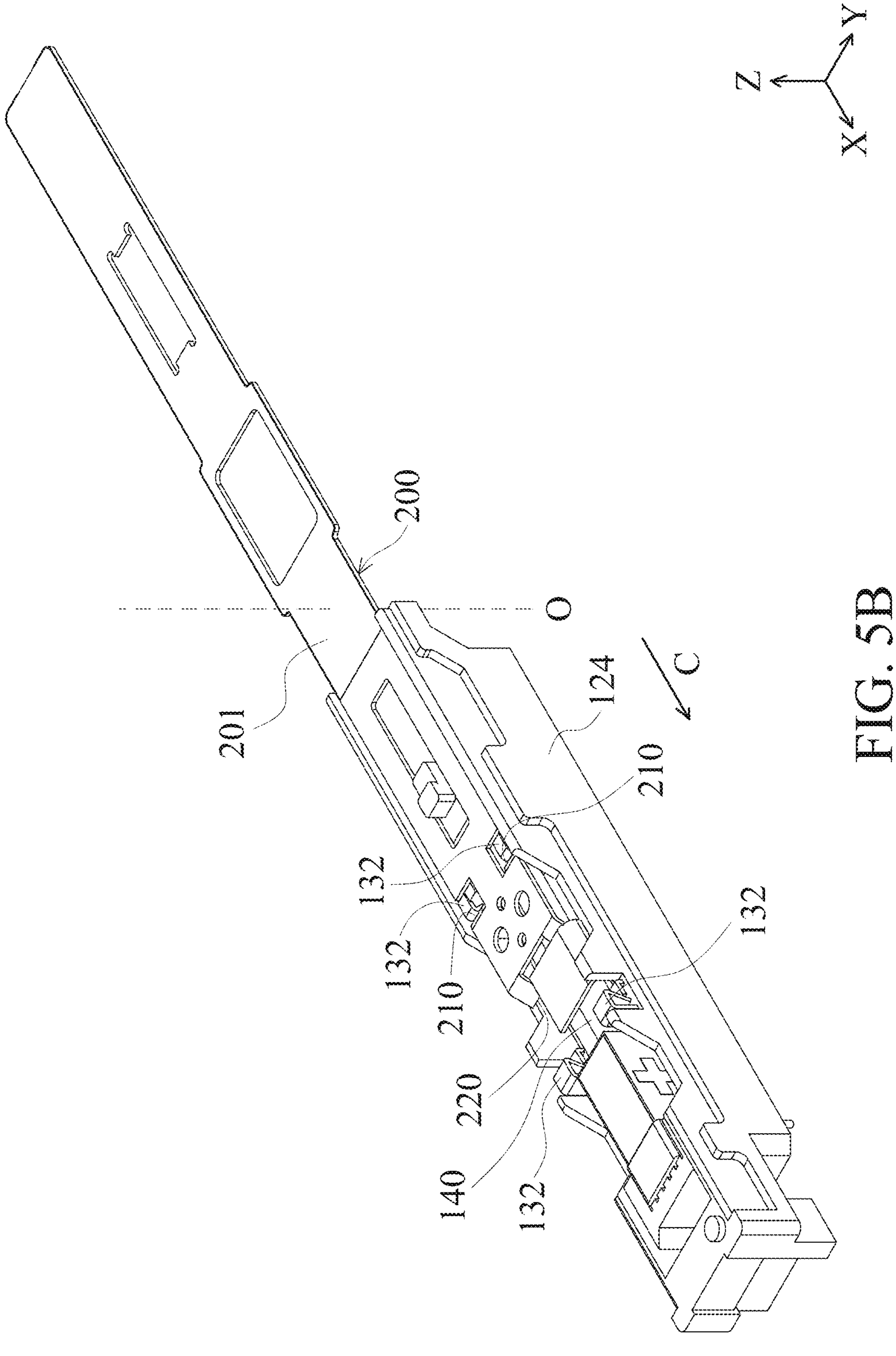
FIG. 5B is a front perspective view of the optical element driving mechanism and the optical element in the first position, according to certain aspects of the present disclosure. For illustrative purposes, the housing is not shown.

Next, please refer to FIG. 5B. FIG. 5B is a front perspective view of the optical element driving mechanism 100 and the optical element 200 in a first position, according to certain aspects of the present disclosure. For illustrative purposes, the housing 122 is not shown. As shown in the figure, when in the first position, the first extending edge 210 of the optical element 200 contacts the deformed part 132 that is electrically connected to the first circuit elements 133 and 134 (please see FIG. 2). Therefore, the first circuit element 133 and 134 are electrically connected via the deformed part 132 and the optical element 200. The first circuit element 133, the deformed part 132, the optical element 200, and the first circuit element 134 are electrically connected. After the first circuit elements 133 and 134 are connected, a signal is transmitted to the external control assembly, indicating that the optical element 200 is in the first position and in a closed state, and the optical axis O does not overlap with the opening 230.

In some embodiments, when the circuit assembly 148 of the driving assembly 140 receives a signal and causes the conductive element 144 to move in the direction of arrow C, the holding part 114 of the movable part 110 holds the conductive element 144. The joint part 112 of the movable part 110 is welded to the optical element 200, so the movement of the conductive element 144 drives the movement of the optical element 200. The optical element 200 moves in a first range between the first position and the second position. During the movement in the first range, the shielding part 201 of the optical element 200 at least partially overlaps the opening 123 of the housing 122. Furthermore, when the optical element 200 is in the first position, the first extending edge 210 contacts the deformed part 132 (see FIG. 5B).

Figure 6A:
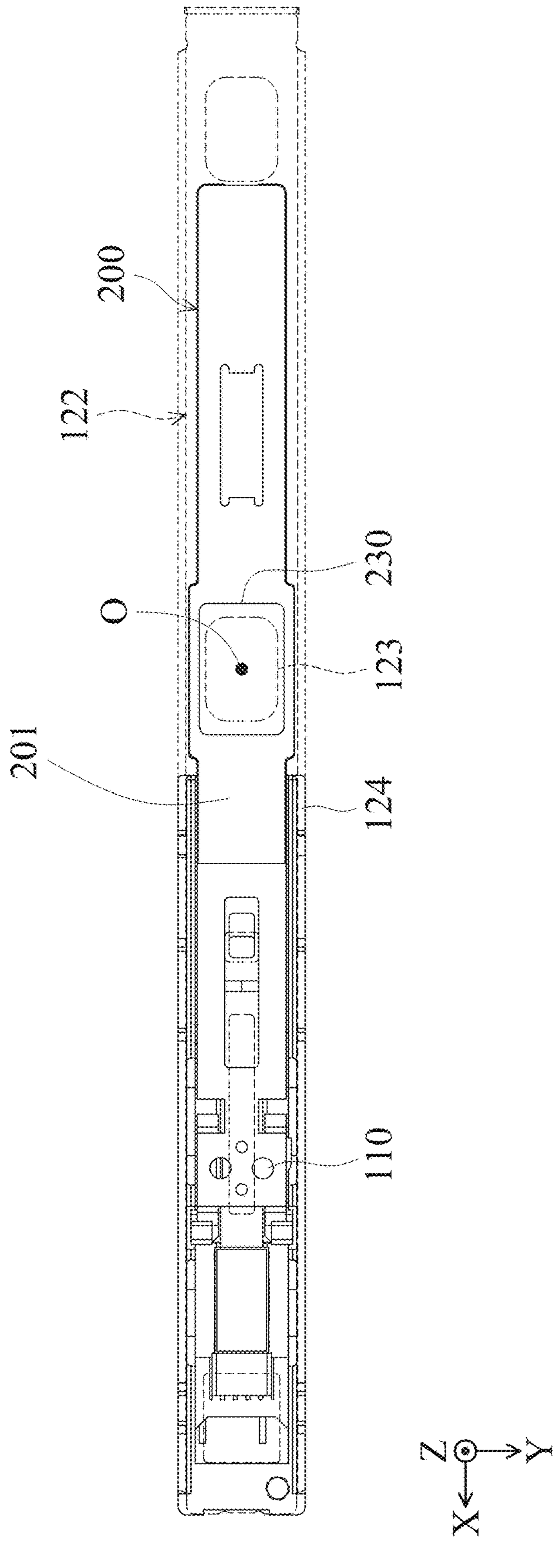
FIG. 6A is a top view of the optical element driving mechanism and the optical element in a second position, according to certain aspects of the present disclosure. For illustrative purposes, the housing of the fixed part is shown in dotted lines.

Next, please refer to FIG. 6A. FIG. 6A is a top view of the optical element driving mechanism 100 and the optical element 200 in a second position, according to certain aspects of the present disclosure. For illustrative purposes, the housing 122 of the fixed part 120 is shown in dotted lines. The conductive element 144 drives the movable part 110 and the optical element 200 to move in the direction of arrow C from the first position to the second position. When the movable part 110 is in the second position, the optical axis O overlaps the opening 130 and the opening 230, and the second extending edge 220 of the optical element 200 contacts the deformed part 132 (see FIG. 6B). The housing 122 at least partially overlaps the shielding part 201 of the optical element 200. The opening 230 of the optical element 200 completely overlaps the opening 123 of the housing 122. At this time, since the light passes through the opening 230 and passes through the optical module, the optical element 200 is in an open state.

Figure 6B:
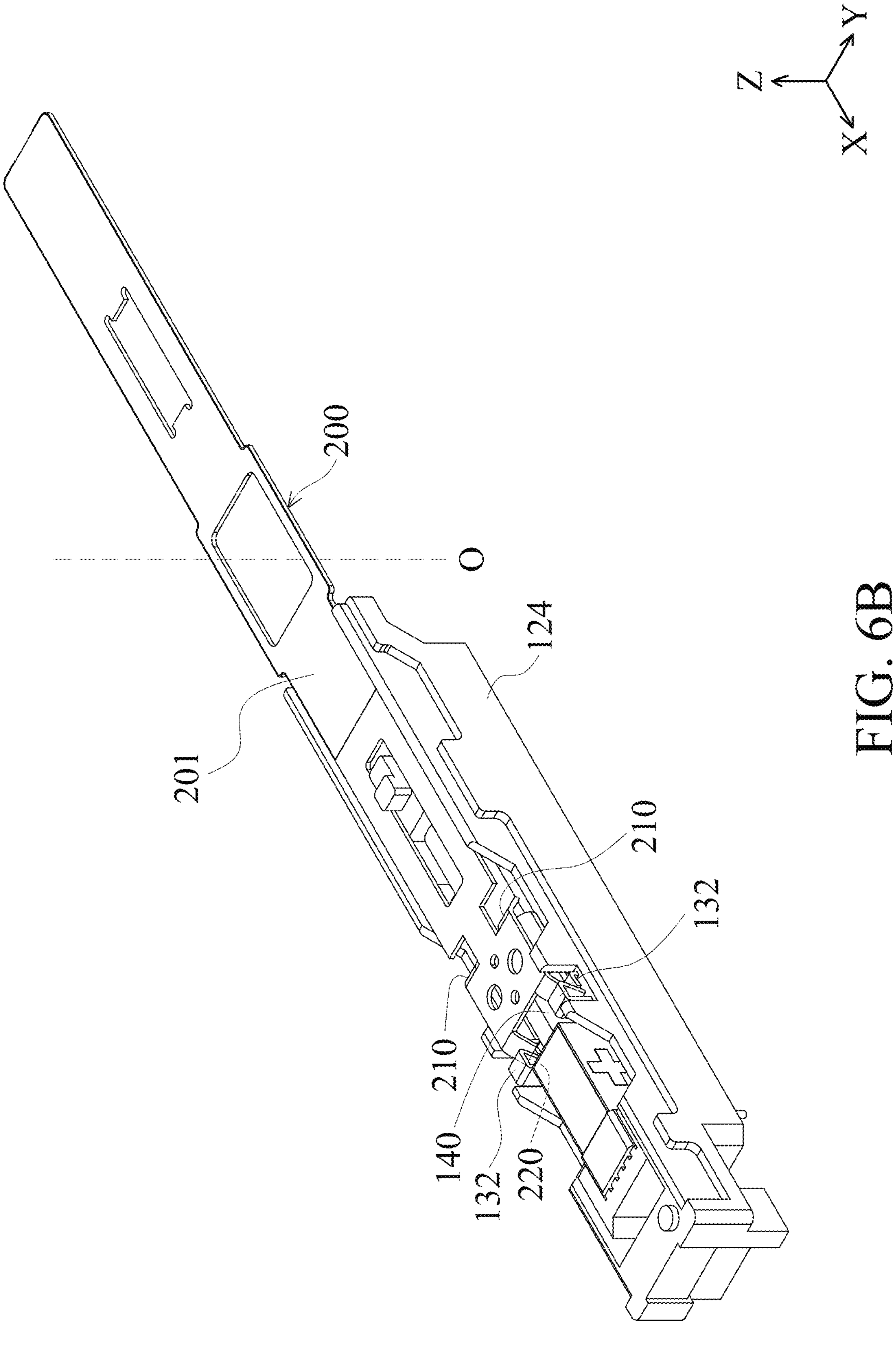
FIG. 6B is a front perspective view of the optical element driving mechanism and the optical element in the second position, according to certain aspects of the present disclosure. For illustrative purposes, the housing is not shown.

Next, please refer to FIG. 6B. FIG. 6B is a front perspective view of the optical element driving mechanism 100 and the optical element 200 in a second position, according to certain aspects of the present disclosure. For illustrative purposes, the housing 122 is not shown. As shown in the figure, when in the second position, the second extending edge 220 of the optical element 200 contacts the deformed part 132 electrically connected to the second circuit elements 135 and 136 (see FIG. 2), so the second circuit elements 135 and 136 are electrically connected via the deformed part 132 and the optical element 200. The second circuit element 135, the deformed part 132, the optical element 200, and the second circuit element 136 are electrically connected. After the second circuit elements 135 and 136 are connected, a signal is transmitted to the external control assembly, indicating that the optical element 200 is in the second position, in an open state, and the optical axis O overlaps with the opening 230.

Figure 7:
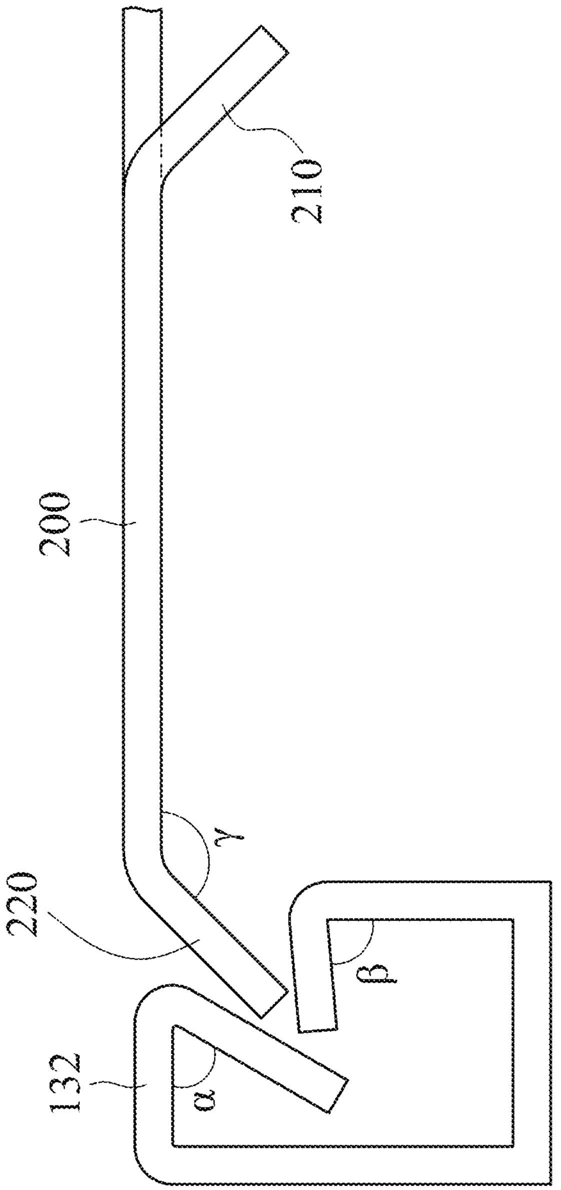
FIG. 7 is a side view of a part of the optical element in the second position and the deformed parts, according to certain aspects of the present disclosure

Next, please refer to FIG. 3 and FIG. 7 together. FIG. 3 is a perspective view of a part of the optical element 200 and the deformed part 132 located in the second position, according to certain aspects of the present disclosure. FIG. 7 is a side view of a part of the optical element 200 and the deformed part 132 in the second position, according to certain aspects of the present disclosure. The extending edge angle $\gamma$, the first angle $\alpha$, and the second angle $\beta$ are different. In this embodiment, the extending edge angle $\gamma$ is wider than the first angle $\alpha$, the extending edge angle $\gamma$ is wider than the second angle $\beta$, and the second angle $\beta$ is wider than the first angle $\alpha$. In some embodiments, the extending edge angle $\gamma$ is at least 1.5 times to more than 2 times the first angle $\alpha$. In some embodiments, the optical element 200 and the deformed part 132 may have the same material (e.g., the same metal, etc.), and the optical element 200 and the deformed part 132 may have the same thickness. Since the optical element 200 and the deformed part 132 have the same material and thickness, when the second extending edge 220 of the optical element 200 contacts the deformed part 132, the extending edge angle $\gamma$ of the optical element 200 deforms easier than the first angle $\alpha$ of the deformed part 132 and the second angle $\beta$. The second extending edge 220 of the optical element 200 contacting the flexible feature of the deformed part 132 allows the optical element 200 to be cushioned when moving between the first position and the second position, thereby reducing the possibility of damage.

In summary, according to certain aspects of the present disclosure, the optical element driving mechanism and the structure and function of the optical element are described. The optical element driving mechanism includes a movable part, a fixed part, a sensing assembly, and a driving assembly. The optical element driving mechanism and the optical element together form an optical module.

According to certain aspects of the present disclosure, the movable part is driven by the driving assembly and drives the optical element to move relative to the fixed part, and the sensing assembly may sense the position of the optical element and output a position signal through electrical conduction. Using position signals and control signals, the movement of the optical element may be controlled. By moving the optical element between two positions to allow light to pass or not pass through the optical element, the optical element may be opened or closed. The sensing assembly senses the position of the optical element through electrical conduction with the configuration of the deformed part and the circuit element (conductive element) without using conventional configurations such as Hall magnetic elements or coils. This is effective to greatly saving the internal space of the optical driving mechanism, thus achieving the miniaturization of the optical driving mechanism.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments may be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising.".

What is claimed is:

1. An optical element driving mechanism, comprising:

a movable part for connecting an optical element;

a fixed part, having an opening for allowing light to pass through, wherein the movable part moves relative to the fixed part; and a sensing assembly for sensing a position of the movable part relative to the fixed part, wherein the sensing assembly has a plurality of deformed parts located on both sides of the fixed part, wherein when the movable part is located within a first range, the optical element at least partially overlaps the opening;

the optical element has a first extending edge and a second extending edge, and the first extending edge and the second extending edge each has an extending edge angle; and each of the deformed parts has a first angle, and the extending edge angles are different than the first angle.

2. The optical element driving mechanism as claimed in claim 1, wherein the deformed parts and the optical element have plate structure.

3. The optical element driving mechanism as claimed in claim 1, wherein the optical element and the deformed parts have the same material.

4. The optical element driving mechanism as claimed in claim 1, wherein the optical element and the deformed parts have the same thickness.

5. The optical element driving mechanism as claimed in claim 1, wherein the first extending edge and the second extending edge are located between the deformed parts.

6. The optical element driving mechanism as claimed in claim 1, wherein an extending direction of the first extending edge and an extending direction of the second extending edge are both toward a base of the fixed part.

7. The optical element driving mechanism as claimed in claim 1, wherein when the optical element is in a first position, the first extending edge contacts the sensing assembly, and the optical element driving mechanism is in a closed state.

8. The optical element driving mechanism as claimed in claim 7, wherein when the optical element is in a second position, the second extending edge contacts the sensing assembly, and the optical element driving mechanism is in an open state.

9. The optical element driving mechanism as claimed in claim 1, wherein the extending edge angles are larger than the first angle.

10. The optical element driving mechanism as claimed in claim 1, wherein each of the deformed parts each has a second angle, and the extending edge angles, the first angle, and the second angle are different.

11. The optical element driving mechanism as claimed in claim 10, wherein the extending edge angles are larger than the second angle.

12. The optical element driving mechanism as claimed in claim 10, wherein the second angle is larger than the first angle.

* * * * *